United States Patent [19]

Severin et al.

[11] Patent Number: 4,841,115
[45] Date of Patent: Jun. 20, 1989

[54] ORBITAL WELDHEAD

[75] Inventors: Joel C. Severin, Anaheim; Mark W. Scaglione, Huntington Beach; William S. Hinds, Costa Mesa; Vytautas J. Jusionis, Westminister, all of Calif.

[73] Assignee: ST International, Santa Ana, Calif.

[21] Appl. No.: 160,666

[22] Filed: Feb. 25, 1988

[51] Int. Cl.$^4$ ............................................. B23K 9/225
[52] U.S. Cl. .............................. 219/60 A; 219/125.11
[58] Field of Search ............... 219/60 A, 60 R, 125.11

[56]  References Cited

U.S. PATENT DOCUMENTS

| 3,534,199 | 10/1970 | Downey et al. | 219/60 A |
| 4,009,360 | 2/1977 | Beetham | 219/60 A |
| 4,379,215 | 4/1983 | Rohrberg | 219/60 A |

*Primary Examiner*—Clifford C. Shaw
*Attorney, Agent, or Firm*—Blakely, Sokoloff, Taylor, Zafman

[57] ABSTRACT

A weldhead for welding small diameter tubing in confined spaces. The weldhead includes a welding body and a separable cartridge. The cartridge has a pair of collet clamps for gripping the two sections of tubing to be joined on either side of the weld joint and for maintaining the tubing in alignment during the welding operation. The weldhead body includes a circular rotor that is notched to fit around the weld joint when the weldhead is inserted into and latched to the cartridge. A tungsten electrode is disposed on the inner circumference of the rotor and is caused to orbit the weld joint by a motor driven gear train. A welding arc is established between the electrode and the tubing and the rotor is then driven so that the electrode orbits the weld joint. Motor speed and welding current are regulated to control the weld puddle size.

10 Claims, 2 Drawing Sheets

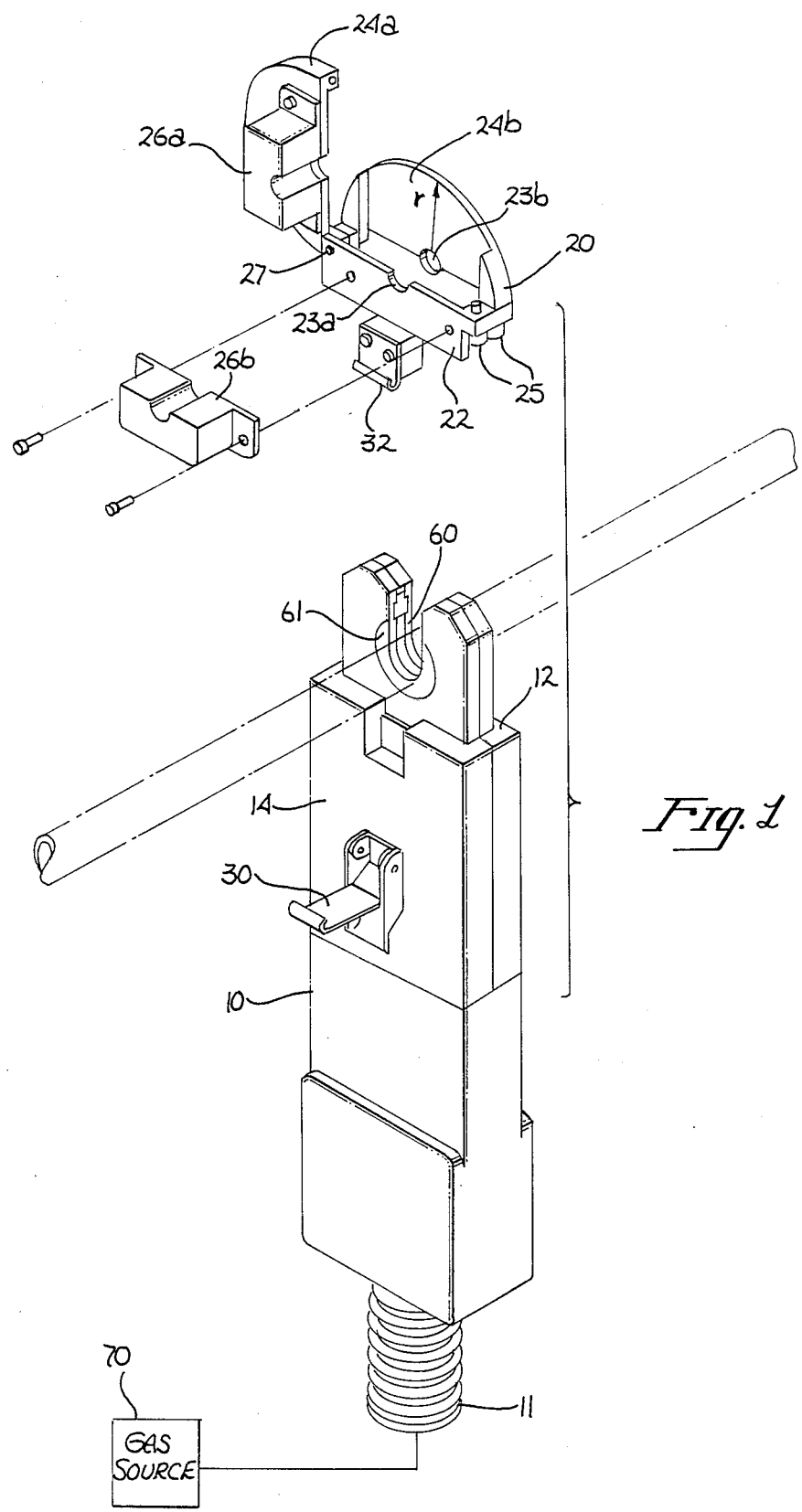

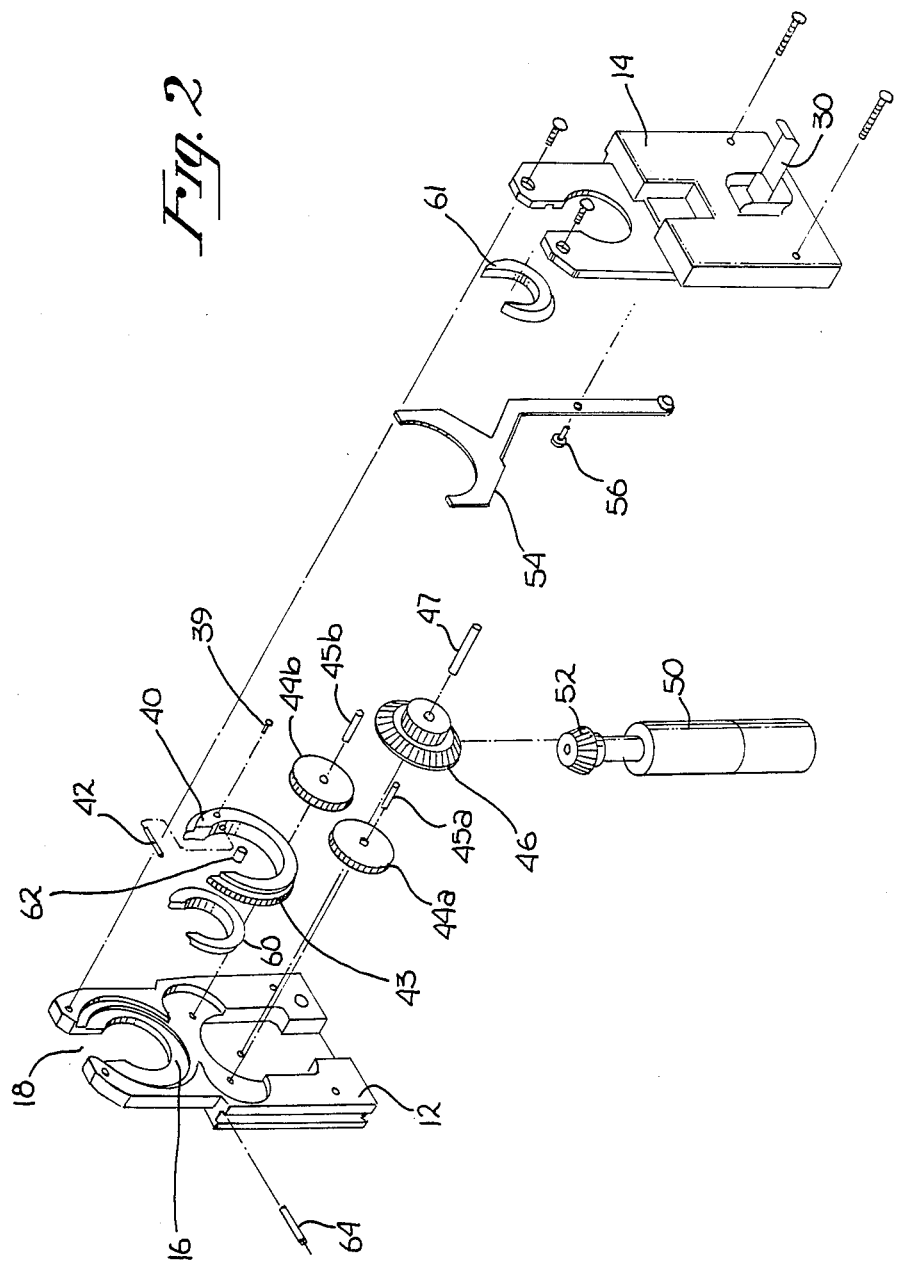

ORBITAL WELDHEAD

SCOPE OF THE INVENTION

This invention relates to an apparatus for performing Gas Tungsten Arc Welding (GTAW), and articularly, to an orbital weldhead for welding small diameter tubing in confined spaces.

BACKGROUND

Gas Tungsten Arc Welding is a well known metal joining technique. In certain applications, space limitations preclude the use of conventional GTAW weldheads. In these cases, alternative metal joining techniques have heretofore been required. Such applications include aerospace, semiconductor fabrication equipment and instrumentation. Alternative metal joining techniques include brazing, hand welding and use of mechanical fittings.

Brazing tends to be a more expensive process than welding because of the consumption of a costly braze material. In certain critical applications, such as the joining of space satellite fuel lines, a gold alloy braze material may be required. Furthermore, in most cases, brazing involves use of a flux material which requires post-joining clean up. In some cases, brazing may be done in an oven. However, this precludes in-position joining and, therefore, components to be welded must be prefabricated before final assembly, thereby placing constraints on the assembly sequence. In addition to the foregoing disadvantages of brazing, brazing may be precluded in cases where the braze material is chemically reactive with fluid to be transported inside the tubing.

Hand welding is a versatile process that can accommodate close working clearances, however, the quality of the welded joint is highly dependent upon individual craftsmanship. Hand welding is therefore not a desirable technique in critical applications where consistent repeatability is required Mechanical fittings are also dependent upon individual operator technique with respect to mating and torquing of the fittings. Repeatability is again a problem, but less so than with manual welding. Generally speaking, mechanical fittings are more prone to failure due to mechanical vibration than is a welded joint.

A need therefore exists for a means of producing welded joints of high repeatable quality under conditions where the working clearances preclude the use of conventional weldheads. The present invention provides a weldhead of a much smaller size than those heretofore available and with which highly repeatable welded joints in tubing may be achieved.

SUMMARY OF THE INVENTION

The present invention provides a weldhead particularly adapted for welding small diameter tubing by means of Gas Tungsten Arc Welding in confined spaces.

The weldhead includes a detachable cartridge for holding the tubing in alignment. Collet clamps grip each of the two sections of tubing to b joined and hold them in precise alignment. The weldhead body may then be inserted into the cartridge and latched thereto for performing the welding operation.

The weldhead includes a gear driven circular rotor on which the welding electrode is mounted. The circular rotor surrounds the tubing so that rotation of the rotor causes the welding electrode to orbit the weld joint.

In a preferred embodiment of this invention, the cartridge and weldhead are constructed such that welding of tubing joints may be accomplished where the radial clearance is as small as one inch from the center of the tubing everywhere within an arc extending 180° around the tubing.

The circular rotor may include a small permanent magnet that activates a reed switch located in the weldhead body. The magnet and reed switch are disposed so as to sense when the notch of the rotor is aligned with the opening in the weldhead body. This allows the motor to be controlled so that the rotor may be driven to a "home" position.

BRIEF DESCRIPTIONS OF THE DRAWINGS

FIG. 1 is a perspective view of the present invention showing the cartridge detached from the weldhead.

FIG. 2 is an exploded perspective view of the weldhead body showing the rotor drive train.

DETAILED DESCRIPTION OF THE PREFERRED EMBODIMENT

A weldhead having particular application to Gas Tungsten Arc Welding of small section tubing in confined spaces is disclosed. In the following description, for purposes of explanation and not limitation, specific numbers, dimensions, materials, etc. are set forth in order to provide a thorough understanding of the present invention. However, it will be apparent to one skilled in the art that the present invention may be practiced without these specific details.

Referring to FIG. 1, weldhead 10 is shown with cartridge 20 removed. Sections of tubing (shown in phantom lines) to be joined by a welded joint are secured and maintained in alignment by cartridge 20. Collet clamps 24a and 24b are attached to body 22 at hinge 27 and may be secured in a closed position by latching screws 25. Body 22 of cartridge 20 and each of collet clamps 24a and 24b have mating semicircular notches to form circular openings 23a and 23b when collet clamps 24a and 24b are closed. The diameter of circular openings 23a and 23b are matched to the outside diameter of the tubing to be joined such that the sections of tubing are tightly gripped when collet clamps 24a and 24b are latched in a closed position. Should additional support for the tubing sections be required, collet extensions 26a and 26b may be used. Cartridge 20 is held in place on weldhead 10 by latch 30 which cooperates with latch strike 32 mounted on cartridge body 22. The radius "r" of collet clamps 24a and 24b is less than approximately one inch, thereby allowing welding of joints where clearance is as little as one inch from the centerline of the tubing throughout a 180° arc.

Since cartridge 20 is not permanently attached to weldhead 10, cartridge 20 may be conveniently set up for a welding operation without interference from the weldhead and its associated cabling. It is important to note that cartridges such as cartridge 20 may be constructed with openings of various sizes to accommodate tubing of various diameters. Thus, a single weldhead may be used to join a wide range of tubing diameters. Furthermore, since cartridge 20 is detachable from weldhead 10, a number of tubing joints may be prepared for welding concurrently, the number being limited only by the number of cartridges on hand.

In the described embodiment, cartridge 20 is constructed of tool steel to provide the desirable strength and toughness in a small assembly for holding and aligning the tubing to be welded. The high hardness rating of tool steel provides the grip necessary when working with tubing materials such as stainless steel and titanium.

The detailed construction of weldhead 10 is illustrated in FIG. 2. Weldhead 10 includes body halves 12 and 14 which are fashioned to house the components that will be subsequently described. Body halves 12 and 14 are made of an electrically non-conductive material, preferably a plastic such as polyamid-imid with fiber glass filler. Electrical signals and welding gas are supplied to weldhead 10 through conduit 11.

An arc for welding emanates from tungsten electrode 42. Electrode 42 is retained on rotor 40 by set screw 39. Current is supplied to electrode 42 through rotor 40 by means of brush 54. Brush 54 is secured to weldhead body half 14 by means such as screw 56. Brush 54 is in sliding electrical contact with rotor 40 when weldhead 10 is fully assembled.

Rotor 40 is generally circular with a circumferential notch 41. Notch 41 is large enough to accommodate the largest diameter of tubing to be welded. Electrode 42 extends radially from rotor 40 toward the center thereof. The outside diameter of rotor 40 is cut with gear teeth 43. Rotor 40 rests within race 16 of body half 12 and a corresponding race (not shown) in body half 14. Rotor 40 may thus rotate freely within weldhead 10. In the described embodiment, rotor 40 is made of type 303 stainless steel.

Gear teeth 43 of rotor 40 mesh with spur gears 44a and 44b, which in turn mesh with drive gear 46. Spur gears 44a, 44b rotate on shafts 45a, 45b respectively. Drive gear 46 rotates on shaft 47. Shafts 45a, 45b and 47 are retained between weldhead body halves 12 and 14. Drive gear 46 is driven by pinion gear 52 which is mounted to the shaft of motor 50. Rotary motion provided by motor 50 is thus imparted through drive gear 46, spur gears 44a and 44b to rotor 40. Two spur gears 44a and 44b are required so that drive to rotor 40 is uninterrupted when notch 41 is aligned with one of the spur gears.

It can be seen that as rotor 40 rotates, electrode 42 orbits around the tubing joint. By regulating the speed of rotation of rotor 40 and the current supplied through electrode 42, weld puddle size may be controlled.

Upon completion of a weld, it is necessary that rotor 40 return to a "home" position such that notch 41 is aligned with opening 18 of body 10 so that weldhead 10 may be removed from the workpiece. In order to sense the rotary position of rotor 40, magnet 62 is inserted in rotor 40 near the outside perimeter thereof. Magnet 62 is preferably a rare earth permanent magnet with a high curie temperature such that its magnetic characteristics are not adversely affected by the high temperatures attained during welding. Reed switch 64 in weldhead body half 12 sense the proximity of magnet 62 and provides an electrical signal that indicates when notch 41 is aligned with opening 18. The electrical signal thus produced is used to control motor 50 and bring rotor 40 to a stop in its "home" position.

Weldhead body half 12 includes a notched circular insert 60 concentric with race 16. Body half 14 includes a corresponding insert 61. Inserts 60 and 61 are notched to accommodate the maximum diameter of tubing to be welded. The circular space between the tubing and rotor 40 bounded axially by inserts 60 and 61 is referred to as the welding chamber. During welding, extremely high temperatures are experienced within the welding chamber. To withstand such temperatures, inserts 60 and 61 are preferably made of ceramic alumina. Inserts 60 and 61 also serve as electrical shields to focus the electrical arc to the tubing rather than to the parts of weldhead 10.

The sequence of events necessary to perform a complete welding operation will now be described. The sections of tubing to be joined are first aligned manually and cartridge 20 is latched in position such that the two sections of tubing abut between collet clamps 24a and 24b. As previously discussed, collet extensions 26a and 26b may be employed if necessary to provide greater support for one or both of the tubing sections. When cartridge 20 has been secured to the tubing, weldhead 10 is inserted and locked in position by means of latch 30 and latch strike 32. Next, an inert gas prepurge is begun to displace air in the welding chamber. Gas flow from source 70 is maintained throughout the welding process to maintain an inert gas atmosphere in the welding chamber. Generally, argon is used for the welding atmosphere; however, for certain applications, helium, a mixture of argon and helium, or a mixture of argon and hydrogen may be used, as is well known in the art.

After the welding chamber has been purged of air, high voltage is applied to electrode 42 to establish a welding arc. As soon as the arc is established, rotor 40 is driven by motor 50 causing electrode 42, the weld arc and the resultant hot gas plasma to orbit around the tube. As previously mentioned, the welding current and rotor speed are controlled as a function of tube temperature rise, weld puddle size and weld location. Rotation of rotor 40 continues until there is a small overlap in the weld joint, at which time the welding current is linearly reduced causing the weld puddle to narrow and eventually disappear. Shortly thereafter, the weld arc is extinguished. The flow of inert gas continues until the tubing has adequately cooled such that exposure to air will not unduly oxidize the tubing in the vicinity of the joint. The rotor may then be returned to the home position so that weldhead 10 may be released and cartridge 20 removed from the tubing.

It will be recognized that the above described invention may be embodied in other specific forms without departing from the spirit or essential characteristics of this disclosure. Thus, it is to be understood that the invention is not to be limited by the foregoing illustrative details, except as set forth in the appended claims.

We claim:

1. An apparatus for welding a joint in tubing comprising:
   a weldhead;
   a cartridge selectively attachable to said weldhead having collet means for gripping the tubing on either side of the joint to be welded;
   a circular rotor disposed within said weldhead having a notch in the perimeter thereof to admit the tubing when said cartridge is attached to said weldhead;
   an electrode disposed on an inner circumference of said circular rotor and extending radially therefrom;
   drive means for rotating said rotor so that said electrode orbits the joint;

current supply means coupled to said electrode and the tubing for establishing a welding arc therebetween; and pair of ceramic alumina inserts disposed in said weldhead, one on each side of the joint to be welded, for focusing the welding arc to the joint.

2. The apparatus of claim 1 wherein said weldhead and said cartridge, when attached during welding, extend less than one inch radially from the tubing throughout at least a 180° arc.

3. The apparatus of claim 1 further comprising position sensing means for sensing a rotary position of said circular rotor and for controlling said drive means to stop said rotor in a predetermined position so that said notch is oriented to admit the tubing.

4. The apparatus of claim 1 wherein said electrode is a tungsten electrode.

5. The apparatus of claim 1 further comprising gas supply means for maintaining an inert gas atmosphere around the joint.

6. The apparatus of claim 1 further comprising collet extension means selectively coupled to said cartridge for selectively extending said collet means.

7. An apparatus for welding a joint in tubing comprising:

a weldhead;

a cartridge selectively attachable to said weldhead having a body and a pair of collet clamps hingedly coupled thereto to grip the tubing on either side of a joint to be welded;

a circular rotor disposed within said weldhead having a notch in the perimeter thereof to admit the tubing when said cartridge is attached to said weldhead and having gear teeth on an outer circumference thereof;

an electrode disposed on an inner circumference of said circular rotor and extending radially therefrom;

gear train means for meshing with said gear teeth of said circular rotor;

a motor coupled to said gear train means to impart rotary motion thereto and thence to said circular rotor so that said electrode orbits the joint;

position sensing means for sensing rotary position of said circular rotor and for controlling said motor to stop said rotor in a predetermined position so that said notch is oriented to admit the tubing;

current supply means coupled to said electrode and the tubing for establishing a welding arc therebetween; and a pair of ceramic alumina inserts disposed in said weldhead, one on each side of the joint to be welded, for focusing the welding arc to the joint.

8. The apparatus of claim 7 wherein said weldhead and said cartridge, when attached during welding, extend less than one inch radially from the tubing throughout at least a 180° arc.

9. The apparatus of claim 7 wherein said electrode is a tungsten electrode.

10. The apparatus of claim 7 further comprising gas supply means for maintaining an inert gas atmosphere around the joint.

* * * * *